Figure 11:
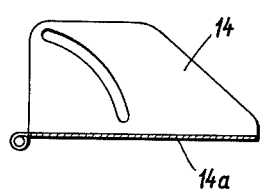

Aug. 17, 1965  P. E. MARTIN ETAL  3,201,035
STACKABLE, UNIVERSAL INDUSTRIAL BIN
Filed July 2, 1962  5 Sheets-Sheet 1
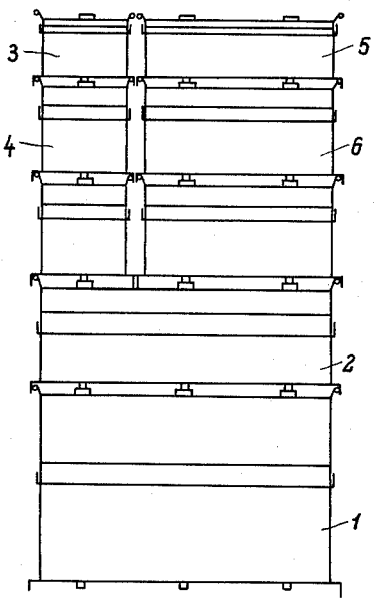
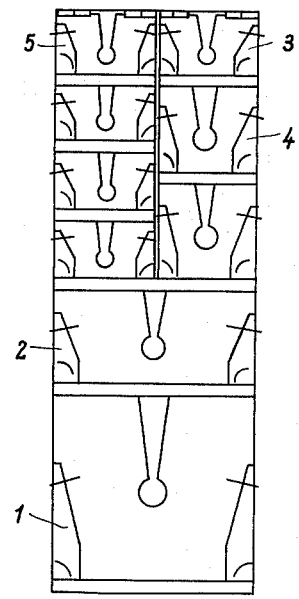
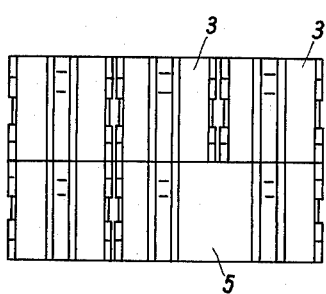
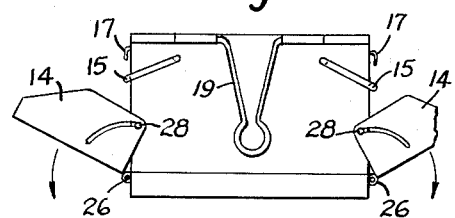
Inventors
P. E. Martin
L. Pernack
By Watson, Cole, Grindle & Watson
Attys.

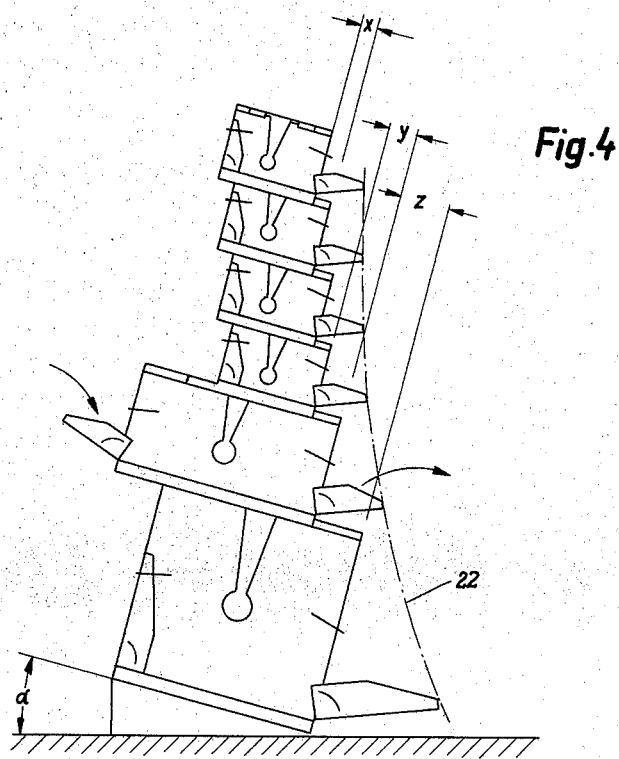
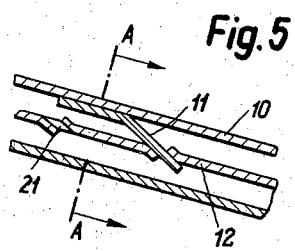
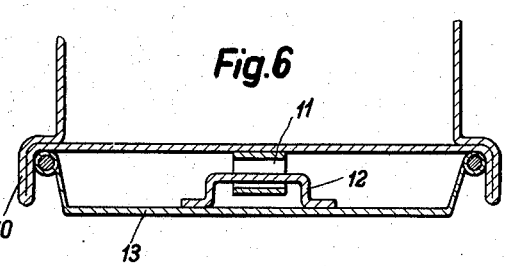

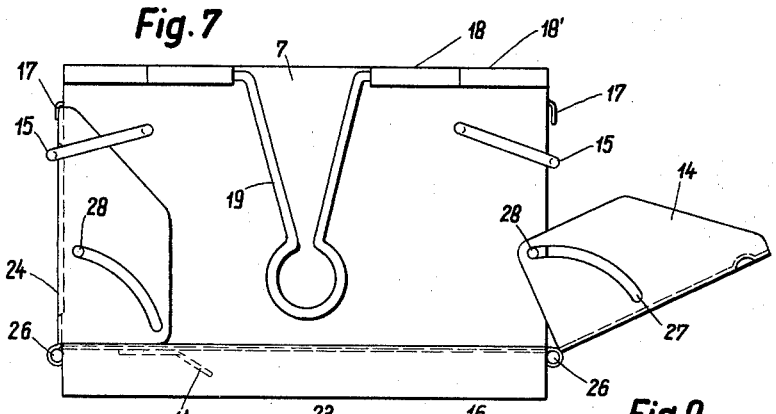
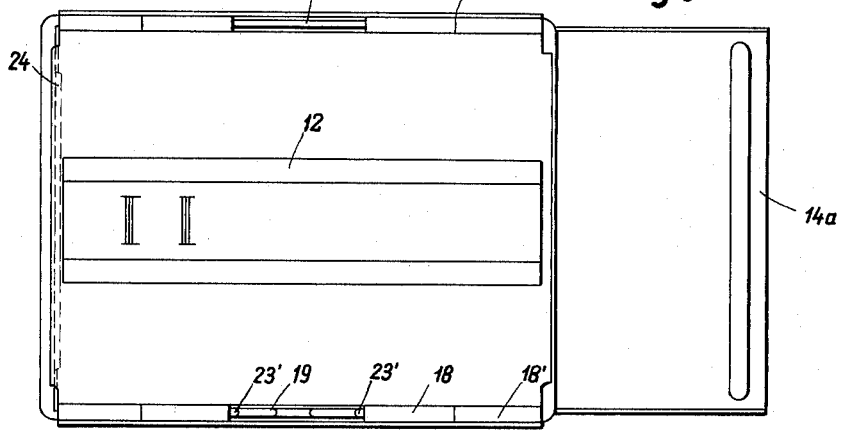
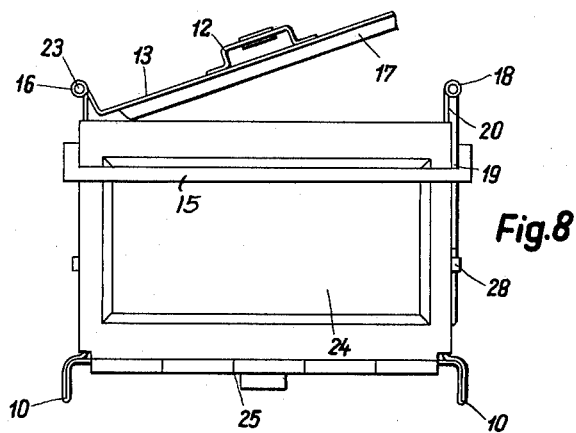

Inventors
P. E. Martin
L. Pernack
By Watson, Cole, Grindle & Watson
Att'ys

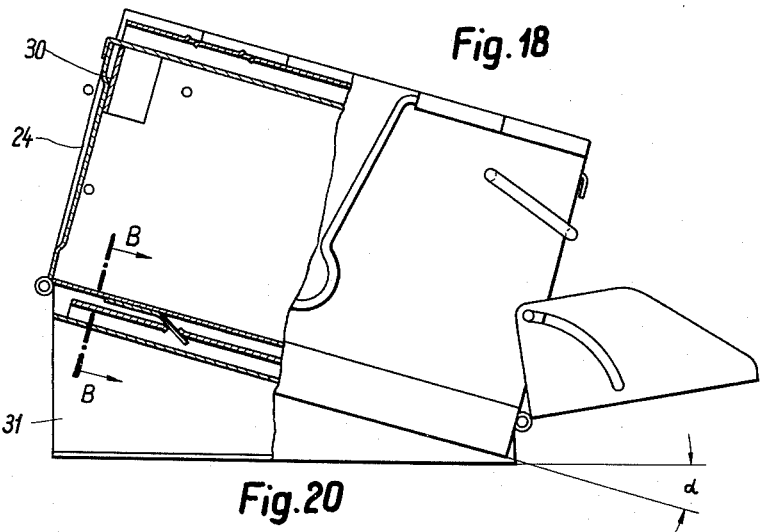
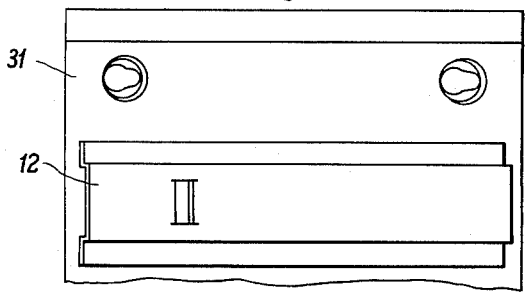
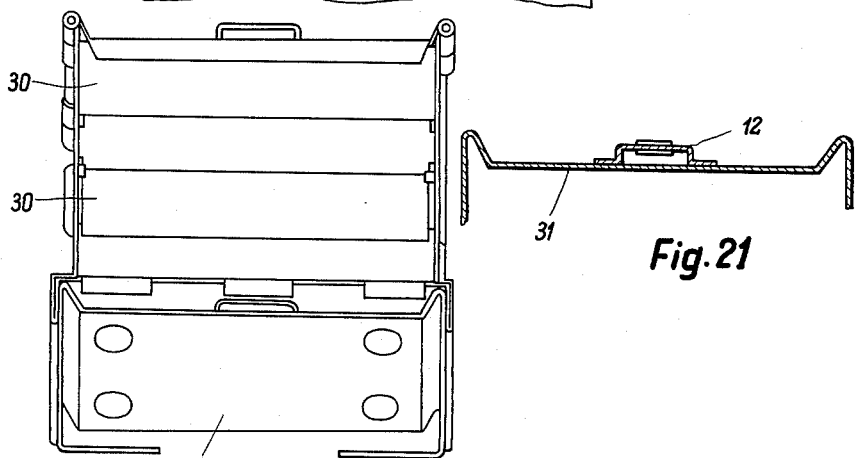

United States Patent Office 3,201,035
Patented Aug. 17, 1965

3,201,035
STACKABLE, UNIVERSAL INDUSTRIAL BIN
Paul Edgar Martin, 2100 Forster St., Harrisburg, Pa., and Lothar Pernack, Karl-Marx-Str. 166, Berlin-Neukolln, Germany
Filed July 2, 1962, Ser. No. 206,836
Claims priority, application Germany, July 5, 1961, P 27,475
6 Claims. (Cl. 232—1)

In modern industrial concerns the problem of material flow has been of major interest for quite some time. Where, e.g., single, small parts are assembled into a production component, time and material is lost whenever transfer fillings are necessary into transport bins or tote boxes between suppliers, storage areas and the work stations. The frequent handling of many small parts in industry creates labor costs far out of proportion to the economic value of the parts themselves.

These costly, unintegrated handling methods, inordinate use of space in storage, and difficulties encountered when trying to place a large number of small parts in a limited work area on the production line called for a new solution superior to the bins presently known.

The following offers a brief review of the state of the art in bins and tote boxes known prior to this most recent development set forth in this application.

Industrial bins and tote boxes exist which permit storage by stacking or alignment on shelves. Some are only transportable singly, others can also be grouped together. Some are made to be placed into special racks at the work station to facilitate the removal of parts for assembly work. Of the many bins available, all have certain disadvantages. For example, when bins are installed at a work station, they must either be filled from the front, or the bin structure must be dismantled for recharge of the individual container. This is time consuming and unproductive labor. In most cases, only bins of the same size can be stacked one over the other. This is seldom beneficial, for in a given amount of time the volume of the individual parts used varies considerably and therefore, it would be most appropriate, desirable and economical to adapt the storage requirement to the volume of individual parts requirement at the work station. When used for transport or storage purposes, bins generally lack the facility to be closed in a dust proof manner unless there is a mechanical addition of one or more extra parts.

Many containers have been developed according to the modular principle, so that they can be stacked above or beside one another to be used in shelf style or as parts bins grouped at work stations. The grouping of containers of different sizes has always presented some difficulty. In one well-known version, grouping of various sized containers can only be accomplished if the grasp openings are turned in different directions, always 90° one from the other.

Therefore, these containers in no way meet the physiological requirements for a fatigueless reach to, and grasp of, the part. Here also an inclination of the container toward the operator is omitted, which causes much difficulty for the operator in the grasping of some few remaining parts.

As regards refilling a model exists which can be refilled from the rear, but possibilities to stack various sizes one on the other, to attach bins rigidly one to the other, to incline the bins toward the operator, to effect dust-proof closure—are not present.

This invention is the realization of a stackable, universal industrial bin, which, thanks to its propitious design, is especially qualified as a storage, transport and work station bin—without the need for extra parts—and which incorporates the advantages of stability with variable stacking possibilities.

In particular the invention takes into consideration that the individual bins—either standing alone or stacked at the work station—can be simultaneously emptied in a grasp advantageous manner and easily refilled from the rear without disturbing the work process.

The bins can be stacked in broad variation over and beside one another, and can be locked together so that the center of gravity remains stable. In addition, the various sizes of bins can be so stacked together that the parts volume requirement can best be realized.

Thus the invention is a stackable, multi-purpose bin which meets the requirements for storage, transport and dispensing of assembly parts at the work station. They are distinguished by the following characteristics:

(a) They are constructed according to the building block principle, (b) Based on (a) above, various sizes have been calculated which are mathematical progressions of a basic type, (c) Two opposite side surfaces have shovel-shaped lips to permit filling and dispensing of parts, (d) The top and bottom surfaces are equipped with elements which permit the bins to be locked together when stacked, (e) These elements on the top and/or bottom surfaces are a metal guide strip which contains a female locking contrivance on one surface and a corresponding male locking contrivance on the other surface, (f) the female locking contrivances are so arranged one behind the other that if the bottom bin is inclined towards the dispensing side the thereon stacked bins can be locked in a position which permits the centers of gravity to remain perpendicular to the base in a logical stack combination, (g) If bins of different sizes are stacked one upon the other—where understandably bins of larger volume are placed beneath bins of lesser volume—a noteworthy physiologically favorable reach results. This follows from building block or modular principle which permitted the appropriate calculation to construct the larger volume bins with higher walls with corresponding longer dispensing and filling lips.

Further characteristics of this invention, the multi-purpose bin, can be seen in the following description and examples of usage as well as attached sketches.

Figure 13:
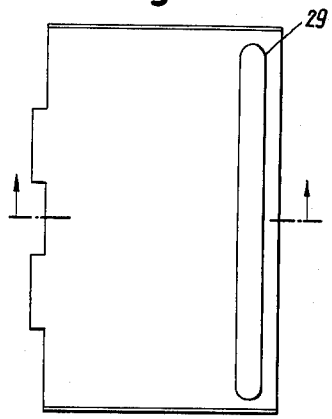
Figure 12:
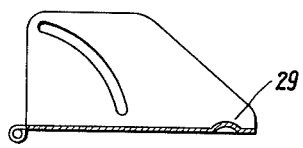
Figure 14:
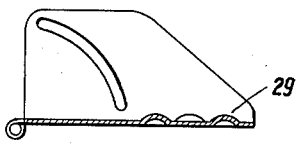
Figure 16:
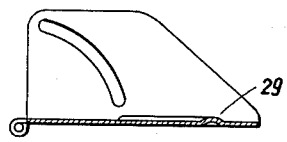
Figure 15:
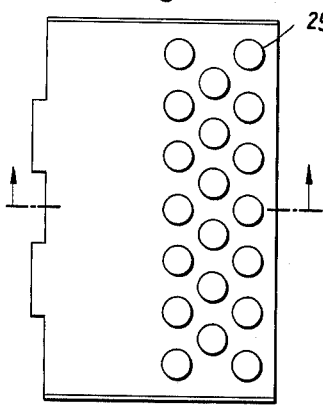
Figure 17:
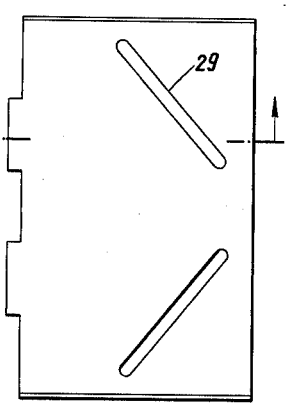

The sketches show:

FIG. 1 is a schematic front view of a bin group serving as a storage stack, comprised of bins of various sizes, FIG. 2 is a schematic side view of the same stack, FIG. 3 is a schematic top view of the same stack, FIG. 4 is a schematic side view of a bin stack comprised of various sized bins locked into set-back position for work station application with opened dispensing lips (front side) and one opened filling lip (rear side), FIG. 5 is a cross section view of engaged locking contrivances, FIG. 6 is a cross section view of engaged locking contrivances along the line A—A in FIG. 5, FIG. 7 is a side view of a bin with opened dispensing lip, FIG. 8 is a rear view of a bin with open lid, FIG. 9 is a top view of a bin with opened dispensing lip, FIG. 10 is a side view of a bin with both lips open, FIG. 11 is a cross section view of one type of front and rear lip, FIG. 12 is a cross section view of another dispensing lip, with sorting ridge, FIG. 13 is a top view of FIG. 12, FIG. 14 is a cross section view of another type of dispensing lip with sorting warts, FIG. 15 is a top view of FIG. 14, FIG. 16 is a cross section of another type of dispensing lip with guide ridges, FIG. 17 is a top view of FIG. 16, FIG. 18 is an inclined plane base with mounted bin in partial cross section, FIG. 19 is a rear view of inclined plane base with mounted bin without rear lip according to FIG. 18, FIG. 20 is a top broken view of inclined plane base according to FIG. 18 (without bin), FIG. 21 is a cross section view along line BB in FIG. 18 without bin.

As shown in FIGS. 1 to 3, the bins have been so constructed proportionally one to the other that in a horizontal position one can, for example, place on bin (1) one or more bins 2. In the same way, one can place on bin 1 and/or 2 the bins 3 and/or 5 and/or the bins 4 and/or 6.

The design permits the placing of two bins 3 or 4 on the bins 5 or 6 or the placing of bins 5 or 6 on two bins 3 or 4.

Either bin 1 or 2 can have placed upon it six bins like size 3 or six bins like size 4, or two bins like size 5 or 6, plus two more like size 3 or 4. This illustrates the variety of combination possibilities.

Thanks to the special design and proportion the bins are especially suited as storage containers because they can be variably put together with great space economy and can function in shelf-like construction in any area.

As FIG. 4 shows, the bins can also be stacked on an inclined plane with an angle alpha towards the filling side. In this position the contents tend to slide toward the opened dispensing lip, whereby the dispensing of the parts is greatly facilitated.

FIGS. 5 to 8 show that all the bins have a special base profile 10, which is constructed to serve in the dual function of (a) Foot edge (b) Side guide in stacking.

On the base profile 10 is attached a male locking contrivance 11, as shown in FIGS. 5, 6 and 7. This male contrivance engages with the metal guide strip 12 which is fixed to the lid 13 of all bins. The resulting locking action contributes to the stack stability in all directions.

The metal guide strip 12 also serves to substantially reinforce lid 13.

The female and male locking contrivances can be of varied shape and design.

The required locking action of these containers can also be achieved by special designs of male-female contrivances other than those shown here, e.g. hooks, nipples, sockets, springs, wedges, etc.

The same locking possibility exists when the locking elements are placed in reversed order on the base profile 10 and lid 13.

FIG. 5 shows that the guide strip 12 can have not only one but several female locking contrivances, so that the male locking contrivance 11 can be moved sideways and inserted in the opening 21. This permits that the bins can not only be locked in the normal storage position shown by FIGS. 1 to 3, but can also be locked in a set-back position. In this manner, as shown in FIG. 4, the inclined set-back position becomes possible in which the predetermined set-back distances of x, y and z become effective.

If the bins are stacked according to FIG. 4, the bin bases are inclined in a certain angle alpha to the horizontal. Therefore certain basic conditions must be fulfilled to guarantee a stable bin stack.

The predetermined set-back distances have been so chosen, that the lower front edges of all the stacked bins lie very nearly on a perpendicular axis to the base. If this condition is fulfilled, the entire stack has a stable center of gravity. If various sized bins are stacked according to FIG. 4, an imaginary line taken from the extended lip points results (see line 22) in a line which closely conforms to the radial arm motions of the body.

FIGS. 7 to 10 show the detailed construction of the bin.

As shown, the bins have three separate openings, namely (a) Hinged lid 13.

(b) Two lips 14 (front and rear).

The hinged lid 13 is attached to the bin body 7 by the hinge 16 on which it swings. The lid 13 has a flange 17 which can serve to lock the lips 14 against involuntary opening. This is independent of the stirrup 15 which is an additional locking device. When the lid 13 is opened as shown in FIG. 8, and the flanges cease engaging the upper edges of lips 14, the lips 14 still will not involuntarily open because the stirrup 15, as shown in FIGS. 7 and 8, assume a holding function.

When the lid 13 is opened as shown in FIG. 8 and the flanges 17 cease their locking function, the lips 14 still will not involuntarily open because the stirrups 15, as shown in FIG. 7 and 8, assume a holding function.

If the lid 13 is closed, the lips 14 when closed can lie against the outer side of flange 17. Also in this position the lips 14 are still secured by stirrups 15. Lips 14 can also be secured by other devices, and not only by stirrup 15.

In the hinge housing 18 of the bin body 7 and the hinge housing 18' of lid 13, there are—as shown in FIG. 7— one axis 23 (FIG. 9) and a spring lock 19, which in released position secures lid 13 flush to the bin body so that the lid cannot open involuntarily. When the spring lock 19 is pressed together, its ends are withdrawn from the hinge housing 18' of the lid, so that the lid can be opened.

The spring lock 19 can be substituted by a straight wire axis 23. In this case lid 13 becomes an immobile part of the bin body. The spring lock 19 can optionally be assembled on the left and the wire pin 23 on the right of the bin (FIGS. 7, 8, 9) or vice versa.

When the lid 13 is closed flush with bin side 20 by means of spring lock 19, and at the same time the lips 14 are locked by means of the lid flanges 17, the contents are protected to the greatest extent against external mechanical influences during transport etc.

FIG. 7 shows that the front and rear lips 14 are attached to the bin body 7 by means of hinge housing 25 (FIG. 8) and a hinge pin 26, which forms the axis pivot. The axial movement of lips 14 is limited in its travel by means of the curved slot 27 and the arresting pin 28.

Because lips 14 are shovel-shaped the contents are restricted from falling out over the sides of the lips during the filling and dispensing process.

The lips 14 can be substituted by special lip types (see FIGS. 12–17) by the simple means of removing the pin 26, exchanging the lip with another, and reinserting the hinge pin 26. The normal type of lip 14 has a smooth dispensing surface 14a, FIG. 11. The special lip types take into consideration the various grasp peculiarities of different parts.

FIGS. 12 and 13 show how one or more sorting ridges can be utilized, so that when for example some small parts are slipped off the lip surface (as in the case of screws, nuts, washers etc.) those parts which the fingers involuntarily covered, but which are not required, are restricted by the sorting ridge(s) from following, so that the control of the grasp for a specific part is facilitated.

The sorting ridges can also be substituted by sorting warts (FIGS. 14, 15) depending on the type of parts to be dispensed.

FIGS. 16 and 17 show guide ridges which help to channel the contents, so that here also the grasp is facilitated.

The entire container or any parts of it can be made from all types of material, e.g., steel, aluminum, plastic, paper, cardboard, wood etc. Also, the surfaces can be treated and coated with metal, plastics, paint etc.

FIGS. 7, 8 and 9 show recess 24 which serves the purpose of labeling the bins.

The lips 14 can have apertures in which clear plastic windows can be inserted in order to permit direct view of the contents.

One of the main aims of the bin is to protect the parts contained therein. Therefore, the bins are very sturdily constructed. For this purpose two connecting strips 30 are attached to the bin body 7, as shown in FIGS. 18, 19. The protection of the contents can be increased by special linings of the interior bin surfaces made of paper, cardboard, wood, rubber, plastics etc.

The container or parts thereof can be manufactured out of perforated materials. This enables the bin to be used as a transport container for acid baths, pickling and washing operations. By the same token, the perforated bin can serve as a means of transporting live goods, such as bees, mice, plant cultures etc.

In the transporting of empty containers it is often desirable that the bin occupy the minimum of transport volume. For this purpose the bin sides 20 can be manufactured as movable or removable elements of the base profile 10. In the same way the connecting cross pieces 30 (FIGS. 18, 19) which stabilize sides 20 can also be designed as a hinged element or one which can be readily disassembled.

This results in the fact that the bin can be completely folded together and thus occupy the least volume during transport.

At the work station the bins can be used either alone or in a stacked fashion.

Standing alone, the bin can be used either with lid 13 opened or closed and/or closed and/or opened lips 14.

As the lips 14 open, two workers who sit opposite each other, can obtain parts each from his own side. One bin can act as a dispensing facility from two sides if desired, and indeed from the top as well if lid 13 is opened.

If the bins are stacked at the work station as shown in FIG. 4, a further advantageous characteristic of the bin is realized: it can be refilled from the rear while a worker is taking parts from the front, without disturbing or altering the stack structure at the work station.

FIG. 4 shows how this refilling can be accomplished from the rear side. This is done by first lifting the stirrup 15 (FIG. 7) and then moving the rear lip 14 away from the outer surface of flange 17 of lid 13 and swinging it down to its open position.

Now the container can be refilled without disturbing the dispensing operation proceeding at the front.

After refilling, the rear lip 14 can be closed again in reversed manner to the opening.

The base 31 has an inclination of angle alpha as shown by FIGS. 18, 19, 20, 21. This base 31 is also equipped with guide strip 12, so that if base 31 is fixed to a work station surface it becomes the basic fastening stabilizer for the bin stack.

We claim:

1. A stackable, multi-purpose container bin of approximately rectangular shape for the storing, transporting and dispensing of solid articles, especially of parts used in industrial assemblies having elements on the bottom and lid surfaces for keeping the vertically stacked containers together by an interlocking action, comprising a base and two opposite sides, shovel-shaped lips on the two opposite sides hinged at the base, so that when the bins are stacked in set-back position and the lips are in open position the bins can be filled with parts from one side simultaneously while parts are being taken out from the opposite side, and a bin lid provided with a protruding flange to engage a top rim of the hinged lips, so that when the lid is closed, the flange secures the hinged lips in closed position.

2. A container bin according to claim 1, in which a lid is provided which has on two opposite edges disengageable hinge housings to thereby permit it to be assembled so that it can be opened to swing optionally from either side of the bin when one side is disengaged and does not serve as the axis of rotation.

3. A stackable, multi-purpose container bin according to claim 1, including a wedge-shaped inclined plane member serving as a base, said member having locking elements to secure at least one bin for locking onto it in either one of two pre-determined set-back positions to thereby maintain the bin in an inclined position to facilitate the removal of contents in either a seated or standing work position.

4. A stackable, multi-purpose container bin according to claim 1, wherein one of said lips is provided with dentations on a dispensing surface to facilitate accuracy of finger control in the grasping of small or irregular-shaped parts which lie on the dispensing surface.

5. A stackable, multi-purpose container bin of approximately rectangular shape for the storing, transporting and dispensing of solid articles, especially of parts used in industrial assemblies having elements on the bottom and lid surfaces for keeping the vertically stacked containers together by an interlocking action, comprising a base and two opposite sides, shovel-shaped lips on the two opposite sides hinged at the base, so that when the bins are stacked in set-back position the lips are in open position and the bins can be filled with parts from one side simultaneously while parts are being taken out from the opposite side, a bin lid provided with a protruding flange to engage a top rim of the hinged lips, so that when the lid is closed, the flange secures the hinged lips in closed position, and stirrups provided to additionally serve as movable securing elements of the hinged lips.

6. A stackable, multi-purpose container bin of approximately rectangular shape for the storing, transporting and dispensing of solid articles, especially of parts used in industrial assemblies having elements on the bottom and lid surfaces for keeping the vertically stacked containers together by an interlocking action, comprising a base and two opposite sides, shovel-shaped lips on the two opposite sides hinged at the base, so that when the bins are stacked in set-back position the lips are in open position and the bins can be filled with parts from one side sumultaneously while parts are being taken out from the opposite side, a bin lid provided with a protruding flange to engage a top rim of the hinged lips, so that when the lid is closed, the flange secures the hinged lips in closed position, and stirrupis to additionally serve as movable securing elements of the hinged lips and being mounted to the container bin with sufficient play so that the hinged lips are secured either by being engaged by the protruding flange of the lid or by being engaged by the stirrup when disposed against the outer surface of the flange.

References Cited by the Examiner

UNITED STATES PATENTS

| | | | |
|---|---|---|---|
| 577,452 | 2/97 | Richardson | 232—43.1 |
| 895,867 | 8/08 | Kirk | 211—84 |
| 1,126,977 | 2/15 | Gargam | 232—1 |
| 2,199,970 | 5/40 | Mitchell | 232—1 |
| 2,522,483 | 9/50 | Plack | 211—11 |
| 2,563,094 | 8/51 | Becker | 232—24 |
| 2,703,200 | 3/55 | Burbank | 232—43.4 |
| 2,715,559 | 8/55 | Villo | 220—97 |
| 2,974,808 | 3/61 | Joyce | 220—97 |
| 3,030,163 | 4/62 | Gottsgen | 220—97 |
| 3,081,023 | 3/63 | Taylor | 232—24 |
| 3,107,012 | 10/63 | Rothenberg | 211—11 |

FOREIGN PATENTS 1,246,287  10/60  France.

FRANK B. SHERRY, *Primary Examiner.*